United States Patent Office 3,840,672
Patented Oct. 8, 1974

3,840,672
CHEESE FLAVORED COMPOSITIONS
Robert L. Kasik and Anthony L. Luksas, Chicago, Ill., assignors to Beatrice Foods Company, Chicago, Ill.
No Drawing. Continuation-in-part of application Ser. No. 824,250, May 13, 1969, now Patent No. 3,674,508. This application June 30, 1972, Ser. No. 268,171
The portion of the term of the patent subsequent to July 4, 1989, has been disclaimed
Int. Cl. A23c *19/02, 19/12;* A23l *1/26*
U.S. Cl. 426—43                                     20 Claims

ABSTRACT OF THE DISCLOSURE

A cheese flavor is compounded with a starch to produce the consistency of conventional cheese flavored products. In the preferred embodiment a phosphate is also used to duplicate the characteristic of cheese flavored products.

---

This is a continuation-in-part of copending application Ser. No. 824,250 filed on May 13, 1969, now U.S. Pat. No. 3,674,508, the entire disclosure of which is incorporated herein by reference.

The present invention relates to cheese flavored products. More particularly, the present invention relates to compositions which are flavored with specific cheese flavoring materials.

Cheese is widely used as a food itself, but also as a flavoring agent in foods such as salad dressings, dips, sauces, snacks and the like. However, cheese is relatively expensive and food products flavored therewith are likewise relatively expensive. Additionally, cheese has a rather high fat content and the intake thereof must be restricted by those attempting to control their body weight.

Accordingly, it is an object of this invention to provide cheese flavored products which are relatively inexpensive and which have less fat than similar products flavored with natural cheese. It is a further object to provide compositions which have unexpected advantages when flavored according to the invention. Other objects will be apparent from the following disclosure and claims.

Cheese is made by forming curds in milk, separating the curds from the whey, forming the curds into a mass and allowing the mass to age for some extended time in order to develop the cheese flavor. It has been assumed in the art that various organisms present or introduced during the cheese making process slowly produce the various cheese flavors.

As disclosed in the aforementioned application, it was discovered that particular organisms are responsible for the development of a cheese flavor. This discovery allowed the isolation of these organisms and the growth thereof under conditions found to be favorable for their rapid development, which produces cheese flavor in a relatively short time.

The compositions of that aforementioned application comprise a pasteurized aqueous medium having at least one protein and at least one carbohydrate therein and containing the products of symbiotic growth of a combination of microorganisms consisting essentially of at least 10 organisms per gram of the medium of at least one first nontoxic member selected from the genus Bacillus and at least 10 organisms per gram of the medium of at least one second nontoxic member selected from the genus Streptococcus. Optionally, the composition may also contain specific cheese flavors.

The proteins and carbohydrates which may be utilized by the organisms are not critical. Animal proteins, e.g., milk, or vegetable proteins, e.g., soybean protein, and like vegetable proteins may be used. The carbohydrates may be any of the sugars and starches, such as monosaccharides, e.g., pentoses or hexoses, disaccharides, e.g., lactose or sucrose. The organisms are not sensitive to the particular protein and carbohydrate. Likewise, the particular percentage of protein and carbohydrate in the aqueous medium is not critical, but from .1 gram to 35 grams per 100 grams of aqueous medium of each of protein and carbohydrate are suitable, especially 1 gram of protein and 1 gram of carbohydrate to 7.5 grams of protein and 5.5 grams of carbohydrate. Milk itself provides quite suitable proteins and carbohydrates in the above ranges and is, therefore, a suitable medium for growing the organisms. However, it is not necessary to use only milk, since other milk fractions or products may be used, for example, cream, whole milk, skim milk, milk solids (total milk solids or nonfat milk solids and like fractions or products). It is to be understood, however, that protein sources other than animal, e.g. dairy, sources may be used. For example, defatted soy bean flour (55%–99% protein).

While any nontoxic member of the genus Bacillus and the genus Streptococcus may be used, according to the above-mentioned application, preferred organisms from the genus Bacillus are alvei, cereus, cereus var. mycoides, megaterium, megatherium, subtilis and subtilis var. niger, and from the genus Streptococcus are cremoris, durans, faecalis and lactis. Also within these groups, certain combinations produce quite superior results and are considered to be best modes of the invention. The combinations are the organisms megaterium and/or megatherium from the genus Bacillus and the organisms *S. lactis*-variation diacetilactis (citrate fermenter) and/or *S. lactis-diacetilactis* (citrate nonfermenter) from the genus Streptococcus. Also, specific cheese flavors may be produced by inoculating the above noted combinations of organisms and medium with an organism which will produce a specific cheese flavor (pure cultures, e.g., *P. roquefortii*, or an inoculant of simply natural cheese). These specific cheese flavor organisms may be inoculated into the medium either prior to, during or after fermentation with the combination of Bacillus and Streptococcus.

According to the processes, the medium is heated from at least 145° F. for 30 minutes to 295° F. for 15 seconds, or to pasteurization or sterility at any temperature and time. When the medium is heated to within such temperature and time ranges any organisms which may normally occur in the medium will be substantially killed or retarded to a point that they are prevented from competing with the organisms introduced to produce the cheese flavor. Under the circumstances, the heating step is quite critical. The medium is then cooled to 130° F. or below and preferably below 100° F. The medium however must be maintained above 60° F. and preferably above 85° F. While the medium is maintained within the above-noted temperature range, it is inoculated with at least ten organisms of the genus Bacillus and at least ten organisms of the genus Streptococcus per gram of medium. More preferably, 100 e.g., 10,000 or more, organisms per gram of each genus are placed in the medium. While the ratio of the organisms from the genus Bacillus and the genus Streptococcus is not narrowly critical, it is preferred that the ratio be between 25:75 to 75:25 (Bacillus to Streptococcus). Preferably the medium with the inoculant therein is stirred sufficiently to distribute the organisms throughout the medium. The inoculated medium is then maintained within the above-noted temperature range for up to 10 days, e.g., 1 to 5 days or more during which a symbiotic growth of the organisms takes place.

The inoculant used in the above procedure may be prepared in a similar manner. However, in producing the product or the inoculant, the growth of the combination of organisms must be a symbiotic growth. Organisms from the genus Bacillus and genus Streptococcus do not normally grow in the same medium together. Thus, the Streptococcus usually overpowers the Bacillus and the Bacillus eventually disappears. It is necessary that the organisms grow together in order to fully develop the cheese flavor—hence it follows that a symbiotic growth of the organisms must be obtained. Since it has been discovered that symbiotic growth of Bacillus and Streptococcus is possible, the actual accomplishing of symbiotic growth may be according to the traditional methods in the art. Thus, the combination of organisms may be placed in the medium and growth is attempted for a prolonged period of time, e.g., up to two months. These attempts are made at different temperatures, concentrations of medium, etc., and with a plurality of samples, e.g., 5–50. Since obtaining a symbiotic growth is, mainly, a statistical occurrence, a number of samples may be required before one develops a symbiotic growth. However, once symbiotic growth is obtained, the sample may be used for inoculating larger batches. Also, in developing a symbiotic growth, several transfers of a small portion of growth medium with the organisms therein to fresh medium may be used, as is commonly practiced in the art. This successive transfer and growth, especially when attempted with a number of samples at the same time, is usually the fastest method of obtaining symbiotic growth. The time required to obtain symbiotic growth can vary depending upon the particular organisms of the genus which are actually used and upon the care and control exercised in the growth process. However, under usual conditions and care, the symbiotic relationship will generally be established within 25 to 35 days. However, shorter or longer periods may be used and the exact time is not critical so long as a symbiotic relationship is established. Once the symbiotic relationship is established, the medium is then suitable for inoculating large batches of milk or other mediums containing the protein and carbohydrate for producing the cheese flavors.

After the organisms have been allowed to grow, the product obtained thereby may be used in many ways. For example, the product may be concentrated to produce a high degree and distinctiveness of cheese flavor or it may be pasteurized and dried as a cheese flavored powder or it may be used to mix with an unaged cheese base or naturally aged cheese to make a flavored cheese or cheese product.

Alternately instead of using the ferment alone or mixing with a base such as naturally produced cheese, the ferment may be further inoculated with specific organisms to also produce a specific cheese flavor. The inoculant may be specific organisms responsible for producing the specific cheese flavor, e.g., *Penicillium roquefortii* (blue cheese) and Propionobacter (Swiss cheese), or it may be simply a small amount of the desired natural cheese which will, of course, have the natural flavor producing organisms therein. Only enough inoculant to start the further fermentation is required. This amount is of course quite small, e.g., 10 to 100 or more organisms per gram of ferment (either isolated organisms or those contained in a natural cheese). The inoculated ferment is then further fermented for at least 2 days and will be essentially complete within 20 days, especially 14 or 12 days. However, longer fermenting times can be used if desired, but little further flavor will develop with extended fermentation time. The further fermenting is carried out at about 40° to about 130° F., depending on the particular natural cheese or cheese producing organism used in the inoculation step. The conditions of the further ferment should follow that known in the art for fermenting the natural cheese, e.g., use aeration when fermenting with *Penicillium roquefortii*, anaerobic to microaerophillic conditions for Italian cheese (reduced oxygen tension), all of which is well known in the art and no further details are considered necessary. See for example: Sammis, J. L., "Cheese Making," The Cheese Maker Book Co., Madison, Wisc. (1948) and Kirk-Othmer, "Encyclopedia of Chemical Technology," Interscience Pub., 2nd Ed. (1967), Vol. 13.

Instead of inoculating with specific cheese flavor producing organisms after fermentation with the Bacillus and Streptococcus, those specific organisms may be added either prior to or during the fermentation process. The Bacillus and Streptococcus, when used as a symbiotic inoculum, can be grown in the presence of other organisms without greatly affecting the resulting cheese flavor produced by those organisms. Thus, the Bacillus and Streptococcus may be grown in combination with other specific organisms responsible for producing specific cheese flavors as mentioned above. Here again, the conditions of growth may be the same as those discussed above in connection with the symbiotic growth of the Bacillus and Streptococcus or the conditions may be tailored more toward the conditions required for developing the specific organisms responsible for producing a specific cheese flavor or a compromise therebetween if the two sets of conditions vary widely. Also, a cheese flavor may be produced by growing the Streptococcus and killing those organisms by sterilizing or at least pasteurizing and then growing the Bacillus in the medium, or vice versa. Since this is not a symbiotic but serial growth of the organisms the resulting cheese flavor is inferior, but it is suitable for many purposes, especially as a medium for further growth of specific cheese flavor organisms, as discussed hereinabove.

It should also be understood that the combination of organisms of the invention may be used to inoculate an unripened cheese curd produced in a conventional fashion, e.g., with lactic acid and rennet. Alternately the milk from which the conventional cheese curd is produced may be inoculated with the organisms so that the so-produced unripened cheese curds have the present symbiotic combination of Bacillus and Streptococcus therein, which curds may then be ripened in the conventional manner but in a much shorter time.

The cheese flavor may be used directly as a liquid flavor composition without further processing, other than pasteurization to prevent further fermentation, or the composition may be concentrated or dried to produce a concentrated or powdered flavor composition. The cheese flavor may be combined with a suitable edible base, for example, a natural or synthetic cheese, an animal or vegetable protein or fat (liquid or hydrogenated vegetable fat) or a milk product or fraction (whey, dried milk solids, milk curds, etc.). Thus, the cheese flavors may be added to milk solids to produce a cheese spread, to vegetable fats to produce a cheese dip, to whey solids for producing a cheese flavored powder and butterfat to produce a cheese wedge, or combinations of the foregoing to produce related products.

However, in view of the nature of the cheese flavor produced, it would be desirable to prepare cheese flavored products which closely resemble conventional cheese flavored products not only in terms of flavor but in terms of the physical characteristics thereof. In this latter regard, the viscosity or thickness, along with the mouth feel and consistency of a product flavored with the present cheese flavors is important toward reproducing the characteristics of conventional cheese flavored compositions. The consuming public has come to accept a cheese wedge, e.g., cheddar cheese wedge, as having a certain consistency, mouth feel and body. Likewise, sour cream flavored with cheese, e.g., cheddar cheese to produce a dip is expected by a consuming public to have a certain viscosity, mouth feel and consistency. In a similar manner, a sauce or dip prepared with a natural cheese, e.g., cheddar cheese is expected to have a certain body, mouth feel and consistency.

Basic to the problem of producing the correct body, consistency, viscosity and mouth feel for any particular desired cheese wedge, sauce, dip and the like is the ability to incorporate the present cheese flavors in a composition wherein the viscosity of the resulting composition is not only predictably controllable but heat, cold and storage stable. Since the present cheese flavors are derived from growing a symbiotic combination of organisms in a medium containing a protein and carbohydrate, the present cheese flavor, either liquid or dried, contains a high proportion of protein. Thus, the protein is susceptible to peptization, denaturation and like protein degradation reactions. As is also appreciated in the art, such degradation reactions greatly affect the suspension and solution properties of proteins.

It has now been discovered that cheese flavored compositions can be prepared with the present cheese flavors in which the viscosity, body, consistency and mouth feel can be predictably controlled along with heat, cold and storage stable properties by incorporating in the composition a starch, preferably dissolved in water and more preferably in combination with a phosphate, as more fully hereinafter defined. The compositions may additionally contain optional conventional flavoring, coloring and stabilizing ingredients, as well as emusifiers, fats, oils, extenders, diluents and the like. The starch may be any of the food grade starches derived from tubers such as white potatoes, grains such as wheat, oats, barley and rye, and kernels such as corn. Additionally, the components of starch, amylose and amylopectin, may be used instead of natural starch. In this latter regard, amylose molecules are composed of long, unbranched chains similar to those of cellulose except that they are shorter and the units are joined by alpha-glucosidic 1,4-linkages. Accordingly, similar "artificial starches" such as carboxymethyl cellulose, alginates, and natural gums and related compounds may be used with the present invention. Accordingly, the term "starch" is herein defined to include any natural starch which can be separated with the aid of water and alcohols into amylose and amylopectin and the related carboxymethyl cellulose, alginates and natural gums.

The starch must be at least partially dissolved in water and this may be accomplished at any temperature desired, but elevated temperatures, generally, will allow more rapid and complete dissolution of the starch, e.g., temperatures up to 175° F. Additionally, heating the composition to elevated temperatures may allow for terminal pasteurization of the food composition either after or prior to packaging. Thus, the food composition may be retorted and hot packed which has obvious advantages in the art. However, elevated temperatures in the range of or about, atmospheric pressure, 175° F. present considerable risk in denaturing the proteins of the composition. This can adversely affect the resulting properties of the composition if the denaturation proceeds to an appreciable extent. The safe temperatures can, however, be higher if the composition is under super atmospheric pressure, since the preventing of flash vaporization of water is important in this regard. Accordingly, for example, temperatures up to 240° F. or somewhat higher may be used when the pressure is about 25 p.s.i. or greater. It has also been found that denaturation can be, essentially, avoided if the composition contains a small amount of a phosphate. The phosphate may be any nontoxic alkali metal or alkaline earth phosphate, such as calcium and sodium phosphates, but a sodium phosphate is preferred. Thus, for example, the phosphate may be disodium phosphate, trisodium pyrophosphate, sodium aluminum phosphate, sodium acid pyrophosphate and like phosphates. The composition may contain up to 5% by weight of the phosphate, but 2% or less is preferred, e.g., between .2 and 2%, especially between 1% and 2%.

The amount of starch which may be used in the composition can vary widely depending upon the percentage which is actually dissolved and thus enters into the viscosity controlling function, the ultimate viscosity desired, and the particular starch used. However, the composition may contain from 2% to 50% by weight of the starch, especially between 5% and 40%, e.g., between 10% and 30%.

The composition may contain the cheese flavor discussed above in widely varying proportions, but generally speaking, contents of between 10% and 75% will be used, especially between 20% and 60%, e.g., between 25% and 55%. Additionally, the composition may contain up to 75% by weight, e.g., from 5 to 60%, of one or more foodstuffs such as milk or milk products, e.g., milk solids, cheese, and whey, animal or vegetable oils or fats, grains, cereals, vegetables, coloring agents, emulsifiers, and combinations thereof. The moisture content of the compositions, either added as such or as a part of another ingredient, such as milk, etc., may vary widely, but should be sufficient to dissolve the starch and from as little as 15% to as high as 75%, e.g., 25–65% and especially 35–60%, will be used. The composition may also be compounded with a natural cheese for rounding out the cheese flavor produced according to the aforementioned application. For purposes of the present specification and claims, the terms "cheese flavor" are defined as a composition containing the growth products of a combination of microorganisms in a medium having at least one protein and at least one carbohydrate therein, wherein the combination of microorganisms is a symbiotic combination consisting essentially of at least 10 organisms per gram of the medium of at least one first nontoxic member selected from the genus Bacillus and at least 10 organisms per gram of the medium of at least one second nontoxic member selected from the genus Streptococcus, all of which is disclosed in some detail in the aforementioned copending application. It should be understood, however, that the invention can be successfully conducted with small amounts of common contaminating bacteria in the fermenting medium, since, as noted above, the present symbiotic combination can effectively grow and produce the desired flavor even in the presence of other organisms. Thus, in the present specification the terms "consisting essentially of" the defined symbiotic combination of organisms means that no organisms, other than the defined Bacillus and Streptococcus, are present which would change the essential nature of the product.

In the following examples, the invention will be illustrated in terms of producing specific cheese flavored products but it is to be understood that the invention is not limited to the specific examples but is fully applicable to the foregoing disclosure. In the examples, all percentages and parts are by weight unless otherwise indicated.

EXAMPLE 1

The cheese flavor produced according to Example 2 of copending application Ser. No. 824,250 was mixed with the following ingredients to produce a well agitated mixture thereof.

| Ingredients: | Parts by weight |
|---|---|
| Natural cheddar cheese | 52 |
| Acid whey | 8 |
| Sodium acid phosphate | 14 |
| Disodium phosphate | 2 |
| Hydrogenated soybean oil | 7.5 |
| USDA Yellow No. 5 color | ¼ |
| Cheese flavor (on a solids basis) | 25 |
| Salt | 3 |
| Moisture content of composition | 2 |

The mixture was agitated and spray-dried at 160° F. inlet temperature, 130° F. outlet temperature, to a dry powder.

EXAMPLE 2

A sauce was prepared with the following ingredients.

| Ingredients: | Parts by weight |
|---|---|
| Cheese flavor of Example 1 | 67.7 |
| Corn starch | 25.3 |
| Salt | 6 |
| 4% peppercream | .5 |
| Onion powder | .15 |
| Garlic powder | .05 |
| Yellow food color | .3 |

The foregoing ingredients were combined with fresh milk in a ratio of approximately 5 grams per fluid ounce of milk and heated with stirring just to the boiling point of the mixtures. The product was then hot packed to produce a cheese sauce.

EXAMPLE 3

A flavored spread was prepared with the following ingredients:

| Ingredients: | Parts by weight |
|---|---|
| Cheese flavor of Example 1 | 61 |
| Acid whey powder | 19 |
| Cornstarch | 9.5 |
| Worcestershire sauce (on a solids basis) | 7.5 |
| Onion powder | 2.5 |
| Smoke on dextrose | .5 |
| Red pepper | .1 |

To a 1 part of foregoing ingredients were combined 1.5 parts chopped beef, 1 part water and ½ part ketchup. After thorough mixing a cheddar cheese Worcestershire deli spread was produced.

EXAMPLE 4

A fondue was prepared with the following ingredients:

| Ingredients: | Parts by weight |
|---|---|
| Cheese flavor of Example 1 | 50 |
| Sauterne wine | 17.5 |
| Vegetable shortening | 11.8 |
| Hydrolyzed vegetable protein | .8 |
| Modified tapioca starch | 15 |
| Garlic powder | .4 |
| White pepper | .2 |
| Salt | 2.8 |
| Monosodium glutamate | 1.5 |

The foregoing ingredients were combined with fresh milk in a ratio of 1 ounce of mixture of ingredient per 3 fluid ounces of milk and brought to a boil. Thereafter the mixture was simmered with stirring until thick.

EXAMPLE 5

93.5 parts of the cheese powder of Example 1 were mixed with 3.5 parts of cornstarch, 2 parts of trisodium polyphosphate and 1 part of sodium aluminum phosphate. 15.7 parts of the resulting preblend were added to 4 parts of cornstarch, 79.8 parts of water and 0.5 parts of salt and heated with stirring to 185° to 190° F. for about 10 minutes. The mixture was hot packaged and provided a retortable cheese flavored sauce.

EXAMPLE 6

35 parts of the cheese powder of Example 1 were mixed with 31 parts of sweet whey, 15 parts of starch, 9 parts of acid whey, 8 parts of salt and 2 parts of artificial cheese flavoring and spice to prepare a dry preblend. 5 parts of the preblend were mixed with 16 parts of water and 4 parts of vegetable fat and cooked at 140° to 150° F. until a uniform mixture was obtained. Thereafter the mixture was retorted for 25 minutes at 240° F. and 15 p.s.i.g. pressure to sterilize the mixture and hot packed to produce a retorted cheese sauce.

EXAMPLE 7

To 45 parts of the cheese powder of Example 1 were added 20 parts of vegetable shortening, 20 parts of low heat nonfat dry milk solids, 13 parts of cornstarch, 2 parts of salt and .5 parts of disodium phosphate. To 200 parts of the resulting preblend were added 510 parts of water and cooked with stirring until boiling. Cooking was continued under reduced heat for an additional five minutes to produce a freeze-thaw stable cheese flavored sauce.

EXAMPLE 8

To 45.5 parts of the cheese powder of Example 1 were added 14.6 parts of acid whey, 11.4 parts of sweet whey, 8.5 parts of butter powder, 7.6 parts of sweet powdered buttermilk, 3.8 parts of salt, 2.2 parts of smoke and salt, 2 parts of butter flavor, 2 parts of 4% peppercream and 2 parts of imitation cheddar cheese flavor. 10 parts of the resulting mixed ingredients were added to 40 parts of vegetable oil and heated to 105° F. The hot mixture was passed over 100 parts of corn collettes and the collettes were tumbled in a coating pan to produce cheese flavored collettes.

EXAMPLE 9

To 67 parts of the cheese powder of Example 1 were mixed 15 parts of tomato powder, 5 parts of salt, 4 parts of dehydrated minced onions, 2 parts of 40° heat red pepper, 1 part each of onion powder, garlic powder, paprika, 1% oleoresin capsicum of salt and 1 part of cornstarch. 1 part of the resulting preblend was mixed with 20 parts of sour cream to make a cheese flavored dip.

EXAMPLE 10

To 38 parts of the cheese powder of Example 1 were added 27 parts of nonfat dry milk solids, 11 parts of cornstarch, 10 parts of vegetable shortening, 9 parts of salt, 4 parts of dextrose, 0.5 parts of disodium phosphate and 0.5 parts of lactic acid. 78 parts of the preblend mixture were added to 12 parts of hot water with stirring and 5.5 parts of cooked macaroni. The mixture was heated to boiling and thickening to produce a macaroni and cheese flavored combination.

EXAMPLE 11

A cheese flavor composition was produced according to Example 2 of copending application Ser. No. 824,250 and mixed with the following composition:

| Ingredients: | Parts by weight |
|---|---|
| Blue cheese solids | 49 |
| Cheese flavor (on a solids basis) | 43 |
| Disodium phosphate | 3 |
| Salt | 2 |
| Moisture | 2.5 |

The composition was substituted for the composition in Examples 1–8 and produced the corresponding blue cheese flavored product.

EXAMPLE 12

A cheese flavor composition was produced according to Example 2 of copending application Ser. No. 824,250 and mixed with the following composition:

| Ingredients: | Parts by weight |
|---|---|
| Parmesan cheese | 44 |
| Cheese flavor (on a solids basis) | 34 |
| Hydrogenated soybean oil | 10 |
| Acid whey powder | 7 |
| Disodium phosphate | 1.2 |
| Tetrasodium pyrophosphate | 1 |
| Salt | .9 |
| Moisture | 1.5 |

The composition was substituted for the composition in Examples 2, 3, 5, 6 and 7 and produced the corresponding Parmesan cheese flavored product.

EXAMPLE 13

A cheese flavor composition was produced according to Example 2 of copending application Ser. No. 824,250 and mixed with the following composition:

| Ingredients | Parts by weight |
|---|---|
| Cheese flavor (on a solids basis) | 47 |
| Nonfat milk solids | 35 |
| Sugar | 10 |
| Artificial cheese flavor | 2.3 |
| Disodium phosphate | 2 |
| Hydro soy | 2 |
| Salt | 1 |
| Yeast solids | .2 |
| Moisture | 1.5 |

The mixture was spray-dried as in Example 1 and substituted for the cheese powder in Examples 2, 5, 6, 7 and 9 and produced the corresponding cream cheese flavored product.

What is claimed is:

1. A cheese flavored composition comprising:
   (1) 10 to 75% by weight of a cheese flavor containing the growth product on protein and carbohydrate of a symbiotic combination of organisms consisting essentially of at least one nontoxic member of the genus Bacillus and at least one nontoxic member of the genus Streptococcus;
   (2) 15 to 75% by weight of water; and
   (3) 2 to 50% by weight of starch; in a thickened physical state.

2. The composition of claim 1 wherein up to 5% by weight of a phosphate is contained in the mixture.

3. The composition of claim 1 wherein the composition also contains at least one additional foodstuff.

4. The composition of claim 3 wherein the foodstuff is selected from the group consisting of a cereal, grain, fat, oil, milk or milk product.

5. The composition of claim 1 wherein the amount of the said cheese flavor is 20–60%.

6. The composition of claim 5 wherein the amount of the said cheese flavor is 25–55%.

7. The composition of claim 1 wherein the amount of water is 25–65%.

8. The composition of claim 1 wherein the amount of cheese flavor is 35–60%.

9. The composition of claim 1 wherein the amount of starch is 5–40%.

10. The composition of claim 1 wherein the amount of cheese flavor is 10–30%.

11. A method for producing a cheese flavored composition comprising:
   (1) pasteurizing an aqueous medium containing a protein and a carbohydrate, inoculating the medium with a symbiotic combination of organisms consisting essentially of at least one nontoxic member of the genus Bacillus and at least one nontoxic member of the genus Streptococcus and growing the combination of organisms until a symbiotic relationship of the organisms is established and a cheese flavor is produced;
   (2) adding starch to the cheese flavor of step (1);
   (3) allowing the mixture of step (2) to thicken; and wherein the resulting composition is 10 to 75% of the said cheese flavor, 15 to 75% water and 2 to 50% starch.

12. The method of claim 11 wherein up to 5% by weight of a phosphate is contained in the mixture.

13. The method of claim 11 wherein an additional foodstuff is added to the mixture.

14. The method of claim 13 wherein the foodstuff is selected from the group consisting of a cereal, grain, fat, oil, milk, or milk product.

15. The method of claim 11 wherein the amount of the said cheese flavor is 20–60%.

16. The method of claim 15 wherein the amount of the said cheese flavor is 25–55%.

17. The method of claim 11 wherein the amount of water is 25–65%.

18. The method of claim 11 wherein the amount of cheese flavor is 35–60%.

19. The method of claim 11 wherein the amount of starch is 5–40%.

20. The method of claim 11 wherein the amount of cheese flavor is 10–30%.

References Cited
UNITED STATES PATENTS

| | | | |
|---|---|---|---|
| 3,674,508 | 7/1972 | Kasik | 99—140 R |
| 3,189,464 | 6/1965 | Heinemann | 99—116 |
| 2,160,159 | 5/1939 | Lundstedt | 99—116 |
| 3,075,842 | 1/1963 | Shaver | 99—116 |
| 3,310,406 | 3/1967 | Webster | 99—117 X |

MORRIS O. WOLK, Primary Examiner

S. MARANTZ, Assistant Examiner

U.S. Cl. X.R.

426—36, 65, 215